(12) United States Patent
Mayr et al.

(10) Patent No.: US 9,529,369 B2
(45) Date of Patent: Dec. 27, 2016

(54) STOP VALVE FOR PRESSURE STORAGE VESSEL

(71) Applicant: MAGNA STEYR Fahrzeugtechnik AG & Co KG, Graz (AT)

(72) Inventors: Franz Mayr, St. Marein bei Graz (AT); Armin Scheinost, Bad Gleichenberg (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 210 days.

(21) Appl. No.: 14/072,096

(22) Filed: Nov. 5, 2013

(65) Prior Publication Data

US 2014/0124063 A1    May 8, 2014

(30) Foreign Application Priority Data

Nov. 5, 2012 (EP) .................................... 12191299

(51) Int. Cl.
*F16K 17/26* (2006.01)
*G05D 16/10* (2006.01)
*F17C 13/04* (2006.01)

(52) U.S. Cl.
CPC .............. *G05D 16/10* (2013.01); *F16K 17/26* (2013.01); *F17C 13/04* (2013.01);
(Continued)

(58) Field of Classification Search
CPC .............................. G05D 16/103; F16K 13/00
(Continued)

(56) References Cited

U.S. PATENT DOCUMENTS 3,709,241 A    1/1973   McJones
3,890,999 A *  6/1975   Moskow .................. 137/505.25
(Continued)

FOREIGN PATENT DOCUMENTS

DE    103 12 672 A1   9/2004
JP    2006 146776 A   6/2006
(Continued)

*Primary Examiner* — Kevin Murphy
*Assistant Examiner* — R. K. Arundale
(74) *Attorney, Agent, or Firm* — Jordan IP Law, LLC; Todd A. Vaughn

(57) ABSTRACT

Shut-off valve for a pressure accumulator vessel for a medium, wherein a valve housing has a valve chamber with an intake opening and an outlet opening facing the pressure accumulator vessel, a movable piston, and at least one spring, wherein the piston has at least one axial connecting channel and is guided in an axially movable manner by at least two sealing elements arranged in the valve chamber, wherein a first effective piston surface of the piston, the first effective piston surface facing an inlet region of the valve chamber, and a sealing body form a valve seat, and wherein, by changing the pressure in an accumulator region of the valve chamber, the accumulator region being adjacent to a second effective piston surface, the piston is axially movable and a passage opening arranged between the intake opening and the outlet opening may be reversibly closed and opened, wherein, in the unpressurized state, the passage opening is kept open by the spring.

Pressure accumulator system for a vehicle, comprising at least one pressure accumulator vessel and at least one shut-off valve, which is operatively connected thereto.

16 Claims, 5 Drawing Sheets

(52) U.S. Cl.
CPC .. *F17C 2201/056* (2013.01); *F17C 2201/058* (2013.01); *F17C 2205/0134* (2013.01); *F17C 2205/0323* (2013.01); *F17C 2205/0335* (2013.01); *F17C 2205/0385* (2013.01); *F17C 2205/0394* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/036* (2013.01); *F17C 2225/0123* (2013.01); *F17C 2225/036* (2013.01); *F17C 2260/022* (2013.01); *F17C 2265/065* (2013.01); *F17C 2270/0105* (2013.01); *F17C 2270/0168* (2013.01); *F17C 2270/0189* (2013.01); *Y10T 137/7793* (2015.04)

(58) Field of Classification Search
USPC ............. 137/154, 205, 493.7, 493.8, 505.13, 137/505.25, 599.09
See application file for complete search history.

(56) References Cited

U.S. PATENT DOCUMENTS

| | | | | |
|---|---|---|---|---|
| 4,791,957 | A * | 12/1988 | Ross | 137/505.12 |
| 4,898,205 | A * | 2/1990 | Ross | 137/505.12 |
| 7,757,710 | B2 * | 7/2010 | Larsen et al. | 137/505.25 |
| 2002/0088495 | A1 * | 7/2002 | Semeia | 137/505.25 |
| 2004/0231727 | A1 | 11/2004 | Nomichi et al. | |
| 2006/0137745 | A1 * | 6/2006 | Carnall | 137/505.25 |
| 2006/0231142 | A1 * | 10/2006 | Schwartz | 137/505.25 |
| 2006/0278277 | A1 * | 12/2006 | Carter | 137/505.25 |
| 2009/0242043 | A1 * | 10/2009 | Lev et al. | 137/505.25 |

FOREIGN PATENT DOCUMENTS

| | | |
|---|---|---|
| JP | 2008 299766 A | 12/2008 |
| WO | 2012/137424 A1 | 10/2012 |

* cited by examiner

STOP VALVE FOR PRESSURE STORAGE VESSEL

CROSS REFERENCE TO RELATED APPLICATIONS

The present application claims priority 35 U.S.C. §119 to European Patent Publication No. EP 12191299.2 (filed on Nov. 5, 2012), which is hereby incorporated by reference in its entirety.

TECHNICAL FIELD

Embodiments relate to a shut-off valve for a pressure accumulator vessel for a fluid medium, and to a pressure accumulator system for a vehicle.

BACKGROUND

Devices may be used, for example, in the form of individual valves or as valve combinations in the inlet region of tanks or tank systems of motor vehicles in order to prevent overfilling of the pressure accumulator vessel with fuel during a replenishing or filling operation.

A shut-off valve for a pressure accumulator vessel for a medium, that includes a valve housing has a valve chamber with an intake opening and an outlet opening facing the pressure accumulator vessel, a movable piston, and at least one spring, is known from U.S. Pat. No. 3,709,241. In the case of this valve, a piston is guided in a bore of a valve body in order to limit the filling pressure in a tank. The piston has an elastic sealing element and is pressed against a constricted inlet opening by a spring. Between the bore of the valve body and the piston there is a gap through which gas may pass from the outlet region of the valve into a region of the bore behind the piston, and therefore, the pressure in the outlet region exerts an axial force on the piston, and thus, supports the spring in the closing of the inlet opening. Gas is thus prevented from flowing from the outlet region back to the inlet opening and at the same time the filling pressure is prevented from exceeding a predetermined value.

In addition, it is known that a filling pressure of a pressure accumulator vessel or a pressure accumulator system may be controlled and limited by measuring the pressure and by electronic control of electric valves.

In the applications mentioned, it is desirable for a permissible operating pressure of a pressure accumulator vessel or a pressure accumulator system to be reliably maintained during a filling operation and thus to ensure the maximum operating safety. The filling operation is intended to be able to be carried out as rapidly as possible and with only low energy losses. Wear to valve components is intended to be kept low and damage to pressure accumulator vessels and pressure lines is intended to be prevented.

SUMMARY

Embodiments relate to an enhanced shut-off valve(s) for a pressure accumulator vessel for a fluid medium, and in particular, a shut-off valve which may be permanently assigned to a pressure accumulator vessel and which functions without electric and electronic components.

Embodiments relate to an enhanced pressure accumulator system(s) having increased operating reliability.

In accordance with embodiments, a shut-off valve for a pressure accumulator vessel for a fluid medium, may include at least one of: a valve housing having a valve chamber with an intake opening and an outlet opening facing the pressure accumulator vessel, a piston having at least one axial connecting channel and which is guided in an axially movable manner by at least two sealing elements arranged in the valve chamber, and at least one bias mechanism such as, for example, a spring, wherein a first effective piston surface of the piston that faces an inlet region of the valve chamber, and a sealing body or the valve housing form a valve seat, wherein, a change in pressure at an accumulator region of the valve chamber, the accumulator region being adjacent to a second effective piston surface, the piston is axially movable and a passage opening arranged between the intake opening and the outlet opening may be reversibly closed and opened, and wherein, in an unpressurized state, the passage opening is kept open by the spring.

The result is a purely mechanical shut-off valve which, due to an adjusted spring force, tightly closes the passage opening from a certain pressure and does not open either upon a further increase in pressure or reduction in pressure to negative pressure in the intake opening and therefore always remains closed. A fluid medium may be removed at one or more other locations in the pressure accumulator system.

An advantage of the mechanical shut-off valve is that a pressure accumulator system connected downstream reaches only a desired pressure and the shut-off valve always remains securely closed irrespective of the pressure upstream of the shut-off valve and without an electric actuator. The shut-off valve, therefore, reliably maintains the pressure in the pressure accumulator system connected downstream and does not permit a further increase in pressure due to medium flowing in after.

A further advantage of this valve design resides in the fact that, although in the event of leakages at the sealing seat between piston and sealing body, the pressure accumulator system which is connected downstream may be exposed to an undesirable increase in pressure, the contact pressure force of the piston against the sealing body increases with an increase in the pressure on the outlet side and therefore the leak is reduced again.

It is particularly advantageous that, in the unpressurized state, the passage opening is kept open by the force of the spring. The fluid medium may therefore flow unobstructed into the pressure accumulator vessel until the end phase of the replenishing operation and harmful vibrations in the region of the valve chamber are avoided.

The shut-off valve in accordance with embodiments is particularly suitable for different fluid media, such as, for example, hydrogen, methane, natural gas or a mixture of hydrogen and natural gas. By way of appropriate modifications, use with liquid gas (LPG) and other fluid media is also possible.

In accordance with embodiments, a pressure accumulator system for a vehicle may include at least one of: at least one pressure accumulator vessel and at least one shut-off valve which is operatively connected thereto.

In accordance with embodiments, a shut-off valve for a pressure accumulator vessel may include at least one of: a valve housing having a valve chamber with an accumulator region, an intake opening and an outlet opening facing the pressure accumulator vessel; a piston having at least one axial connecting channel, a first effective piston surface facing an inlet region of the valve chamber and a second effective piston surface adjacent to the accumulator region, the piston being configured to axially move in the valve chamber during a change in pressure in the accumulator region; a sealing body; sealing elements configured to guide the piston during axial movement of the piston in the valve chamber; at least one bias mechanism; and a passage opening arranged between the intake opening and the outlet opening, the passage opening configured to reversibly open and close during the change in pressure in the accumulator region, and, in an unpressurized state, is kept open by the bias mechanism, wherein one of the first effective piston surface and the valve housing form a valve seat.

In accordance with embodiments, a pressure accumulator system for a vehicle may include at least one of: at least one pressure accumulator vessel; and at least one shut-off valve which is operatively connected to the at least one pressure accumulator vessel. The at least one shut-off valve may have at least one of: a valve housing having a valve chamber with an accumulator region, an intake opening and an outlet opening facing the pressure accumulator vessel; a piston having at least one axial connecting channel, a first effective piston surface facing an inlet region of the valve chamber and a second effective piston surface adjacent to the accumulator region, the piston being configured to axially move in the valve chamber during a change in pressure in the accumulator region; a sealing body; sealing elements configured to guide the piston during axial movement of the piston in the valve chamber; a bias mechanism; and a passage opening arranged between the intake opening and the outlet opening, the passage opening configured to reversibly open and close during the change in pressure in the accumulator region, and, in an unpressurized state, is kept open by the bias mechanism, wherein one of the first effective piston surface and the valve housing form a valve seat.

In accordance with embodiments, a pressure accumulator system may include at least one of: at least one pressure accumulator vessel; and at least one shut-off valve operatively connected to the at least one pressure accumulator vessel, the at least one shut-off valve having at least one of: a valve housing having a valve chamber with an accumulator region, an intake opening and an outlet opening operatively connected to the pressure accumulator vessel; a piston in the valve chamber and having a first effective piston surface facing an inlet region of the valve chamber and a second effective piston surface adjacent to the accumulator region, the piston being configured to axially move in the valve chamber during a change in pressure in the accumulator region; a bias mechanism; and a passage opening arranged between the intake opening and the outlet opening, the passage opening configured to reversibly open and close during the change in pressure in the accumulator region, and, in an unpressurized state, is kept open by the bias mechanism.

By using the shut-off valve in accordance with embodiments, by itself and also in combination with electric valves, a plurality of pressure accumulator vessels having a different permissible operating pressure may be operatively connected in such a manner that those pressure accumulator vessels which have a lower permissible operating pressure than a customary or (higher) filling pressure provided for the entire system have, connected upstream, a shut-off valve which is coordinated with the respective permissible operating pressure of the respective pressure accumulator vessel in order to protect the respective pressure accumulator vessel from over-replenishment.

This advantageously serves to increase the reliability against overfilling during refuelling and permits the use of more cost-effective pressure accumulator vessels having lower permissible pressure levels. However, it is thereby also possible for an existing system to significantly increase the storage capacity of an existing pressure accumulator system in a cost-effective manner by way of an additional system and higher pressure level.

In accordance with embodiments, the first effective piston surface and the sealing body may be configured in such a manner that, in a closed position of the piston, a sealing effect occurs at a sealing edge in the region of the outer border of the first effective piston surface.

"Outer border" here means lying radially on the outside, as viewed from the axis of the piston. The outer border of the piston may be obliquely bevelled or rounded, for example in the region of the first effective piston surface. The first effective piston surface may also have a raised bead on the outer border in order to localize the sealing effect in this region.

Advantageously, in this way, when a shut-off pressure is exceeded or when the pressure rises above the shut-off pressure, force is no longer exerted on the piston counter to the closing direction of the piston. The shut-off pressure and the closing behaviour of the shut-off valve in accordance with embodiments are therefore independent of the pressure in the intake opening. In addition, when the valve is closed, axial force(s) cannot be exerted on the piston by the pressure in the intake opening even if there is a rise in pressure in the intake opening and the shut-off valve remains securely closed even in the event of extreme pressure surges.

It is also ensured that the shut-off valve remains closed even if the pressure in the intake opening drops below the shut-off pressure at which the piston has previously closed, since the closing force then continuing is substantially determined only by the pressure in the accumulator region of the valve chamber on the effective piston surface minus the spring force of the spring.

Due to the fact that the intake opening opens radially outside the effective piston surface into the inlet region of the valve chamber, it is additionally ensured that an axial force cannot be exerted on the piston by the pressure in the intake opening.

The second effective piston surface may have a greater surface area than the first effective piston surface. A relatively larger second effective piston surface advantageously makes it possible to realize smaller valves for the shut-off pressure of the shut-off valve.

The piston may have a cylindrical geometric shape or cross-section, and the outer side thereof has sliding surfaces in at least two regions having preferably different diameters.

The at least two sealing elements may be spatially arranged in corresponding clearances in the valve housing. A more cost-effective alternative would be to accommodate the sealing elements in one groove each in the piston. Sealing elements arranged in grooves on the piston prove problematic at very high pressures (200 to 1000 bar). Depending on the pressure, a variable force is exerted on the piston, and therefore, influences the shut-off pressure of the shut-off valve. As a result of the spatial arrangement of the seals in clearances or grooves in the valve housing, in particular in cylindrical sections of the valve chamber, the piston is not subjected to a variable action of force by the pressure of the fluid medium and the shut-off valve remains reliably closed.

The sealing body and/or the piston may be produced from an elastically deformable material. By way of a selection of material adapted to the very high pressures (200 to 1000 bar), the sealing effect is optimized and wear at the valve seat avoided. Particularly suitable materials include plastics, such as PEEK and PAS, or ceramic materials, such as aluminium oxide and silicon carbide, but also special steels and other metals. The shut-off valve does not have to have a separate sealing body. It is also possible for the piston to be sealed directly against the valve housing. Preferred combinations of material are familiar to a person skilled in the art.

A relief region of the valve chamber, which relief region is spatially arranged between the inlet region and the accumulator region of the valve chamber, has a relief opening between the at least two sealing elements. As a result, a fluid medium emerging in the event of leakages at one of the sealing elements cannot result in an increase in pressure in the other region in each case of the valve chamber. Furthermore, the relief region ensures that pressure is equalized when the piston is displaced, thus enabling rapid piston movements and therefore short reaction times of the shut-off valve.

In accordance with embodiments, the relief opening may be connected to a line for disposing of emerging medium. By this way a (combustible) fluid medium which may emerge is transported away from the immediate vicinity of the shut-off valve and may be treated further at low pressure at a suitable location without risk to vehicle occupants.

In accordance with embodiments, the shut-off pressure of the shut-off valve may substantially correspond, directly correlate to, or is otherwise substantially determined by the spring force of the spring and the effective piston surfaces. The spring force of the spring may be dimensioned in coordination with the effective piston surfaces in such a manner that, as the pressure in the accumulator region rises, the shut-off valve reliably closes and remains closed after a predetermined shut-off pressure has been exceeded. The friction at the sealing elements is also important in the dimensioning of the spring force.

In accordance with embodiments, the spring force of the spring may be adjustable via the screw-in depth of a cover. In this way, for example, during assembly, tolerances of the spring force and/or differences in the friction between piston and sealing elements, for example, caused by manufacturing tolerances, may be compensated for.

In accordance with embodiments, in the shut-off valve, spacers may be provided on and/or over the cover of the valve housing while corresponding recesses are provided on and/or over the second effective piston surface of the piston. This advantageously achieves a good distribution of pressure to the second effective piston surface of the piston. This also advantageously achieves accelerated closing of the piston by additional action of the pressure force on and/or over the second effective piston surface, the pressure force acting only when the piston moves out of the starting position. Such an embodiment accelerates the closing of the piston even in the event of a very low gradient of the filling pressure.

It is also advantageous if the valve housing at least partially projects at the end having the outlet opening into an opening in the pressure accumulator vessel and is thus permanently connected to the pressure accumulator vessel. In such an embodiment, the shut-off valve may be arranged in the interior of a pressure accumulator vessel in a space-saving manner and protected from mechanical action of force. As an alternative thereto, the outlet opening may be permanently connected to the pressure accumulator vessel via a pressure line. The fitted position of the shut-off valve, for example, in a tank neck, is thereby largely independent of the fitted position of the pressure accumulator vessel.

In accordance with embodiments, in the shut-off valve, the outlet opening may be arranged so as to be operatively connectable to the pressure accumulator vessel via a valve-receiving block or via an accumulator valve block having at least one additional valve. Accumulator valve blocks are structural units which combine a plurality of valve functions in a compact housing and are fixedly connectable to an opening in a pressure accumulator vessel. The shut-off function, which serves to protect against overfilling, of the shut-off valve may thereby be expanded by further functions in a modular and space-saving manner.

In accordance with embodiments, in the shut-off valve, a pressure control valve, the opening pressure of which lies above the shut-off pressure of the pressure shut-off valve, may be arranged between the accumulator region and the relief region of the valve chamber. This advantageously increases the operating reliability of the pressure accumulator system. Since the shut-off valve does remain closed, without a pressure control valve of this type overheating of the fluid medium caused, for example, by a fire and a resulting rise in pressure in the pressure accumulator vessel would mean destruction of the pressure accumulator vessel. A combination of shut-off valve and pressure control valve in a common valve housing may also be provided.

In accordance with embodiments, the designation of vehicle includes, for example, motor vehicles, rail vehicles, and also watercraft and aircraft.

DRAWINGS

Embodiments will be illustrated by way of example in the drawings and explained in the description below.

DESCRIPTION

Figure 1:
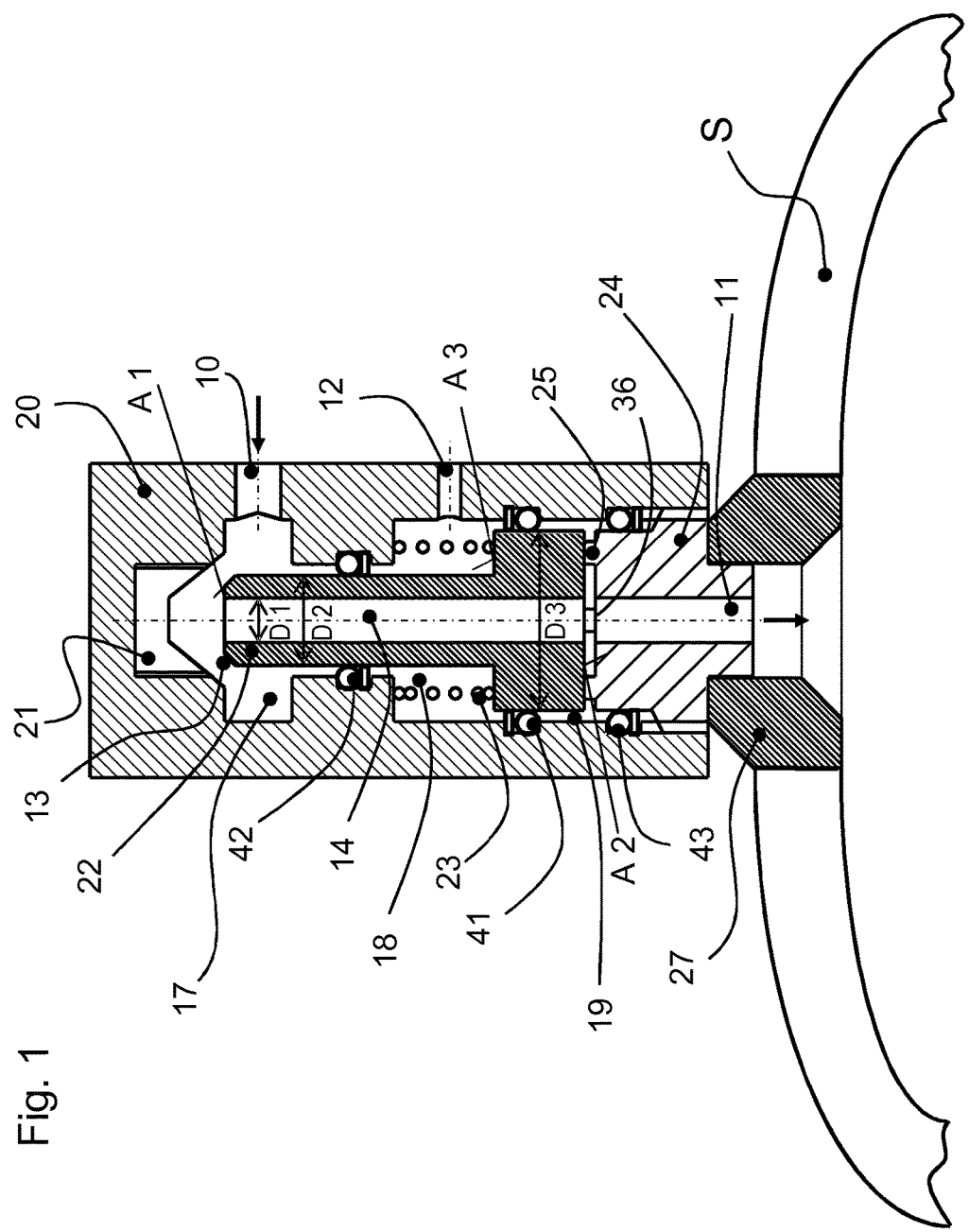
FIG. 1 illustrates a sectional view of a shut-off valve in accordance with embodiments.

As illustrated in FIG. 1, the shut-off valve may be arranged in accordance with embodiments in an opening in a pressure accumulator vessel S via a valve-receiving block 27. A piston 22 having two sections with different outside diameters D2, D3 and a connecting channel 14, which may be designed as a central hollow bore and has the inside diameter D1, may be mounted in a valve housing 20. The piston 22 may be supported at the transition to the larger outside diameter D3 via the support A3 by a bias mechanism such as, for example, a spring 23 on and/or over the valve housing 20, as a result of which the piston 22 may be kept in contact with the cover 24 and the passage opening 13 may be thereby kept in an open position in an unpressurized fitted state.

The piston 22 may be sealed in the housing 20 by first and second sealing elements 41, 42 in the two sections with different outside diameters D2, D3 in such a manner that the space with the spring 23 between the seals may breathe freely through the ventilation opening 12 to the atmospheric pressure. The sealing elements 41, 42 may be fitted either in the piston 22 or, as illustrated, in the valve housing 20. The seal 43 seals off the adjustable cover 24 from the valve housing 20.

During a filling operation, for example, of a pressure accumulator vessel arranged at the outlet opening 11, a fluid medium may pass through the intake opening 10 in the inlet region 17 of the valve chamber via the passage opening 13 and through the connecting channel 14 into the accumulator region 19 of the valve chamber and, in consequence, through the outlet opening 11 into the following pressure accumulator vessel S. If the pressure in the entire pressure accumulator system rises to such an extent that, because of the force ratios due to the pressure prevailing at the effective piston surfaces A2 and A1, the piston 22 overcomes the spring force of the spring 23, the piston 22 may be pushed against the sealing body 21. The shut-off valve closes. This pressure corresponds to the shut-off pressure.

In order not to obtain any further pressure force on the piston, it may be therefore advantageous if the piston 22 is sealed off on the outer diameter D2 with respect to the sealing body 21. In the event of a rise in pressure in the inlet region 17, the shut-off valve continues to remain closed since the increase in pressure no longer acts on the first effective piston surface A1. If the pressure in the inlet opening 10 drops below the pressure at which the piston has closed, the valve nevertheless remains closed, since the closing force is determined by the pressure in the outlet opening 11 on the effective piston surface A2, minus the spring force of the spring 23, and this state has not changed. It is therefore possible to apply negative pressure on the inlet side 10 without the valve opening. The spring force of the spring 23 is additionally adjustable by the screw-in depth of the cover 24.

In order to obtain enhanced distribution of pressure to the second effective piston surface A2, either spacers 25 may be provided on and/or over the cover 24, or corresponding recesses may be provided on and/or over the piston.

Figure 2:
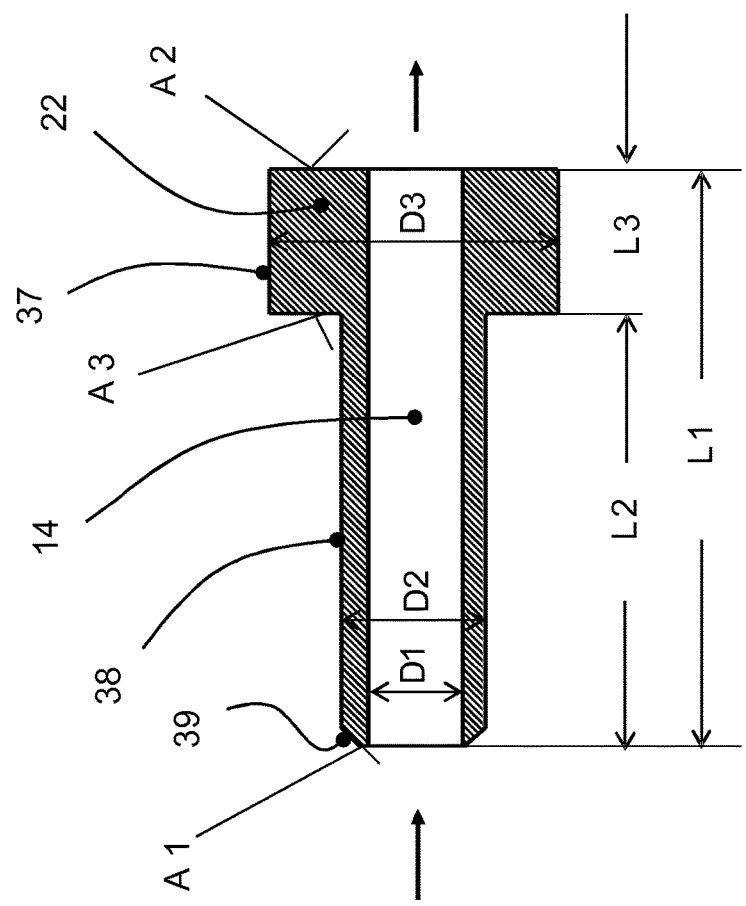
FIG. 2 illustrates a sectional view of a piston for a shut-off valve in accordance with embodiments.

FIG. 2 illustrates a piston 22 of the shut-off valve in accordance with embodiments in detail by way of example. In the embodiment illustrated, the piston 22 may have an overall length L1 with two sections having different outside diameters D2 and D3. A first piston section may have a first effective piston surface A1 formed normally to the axis of the piston 22, a sealing edge 39 formed as a bevel on an edge of the piston, and a first sliding surface 38 with the length L3 and an outside diameter D2. A second piston section may have a second effective piston surface A2, a support A3 for the spring 23 and a second sliding surface 37 with the length L3 and an outside diameter D3. The connecting channel 14 may be designed as an axial bore over the entire length L1 of the piston 22 and has an inside diameter D1. The connecting channel 14 connects the two effective piston surfaces A1, A2 and, corresponding to the embodiment of the valve housing 20 and the operating state of the shut-off valve, a fluid medium flows through the connecting channel 14.

Figure 3:
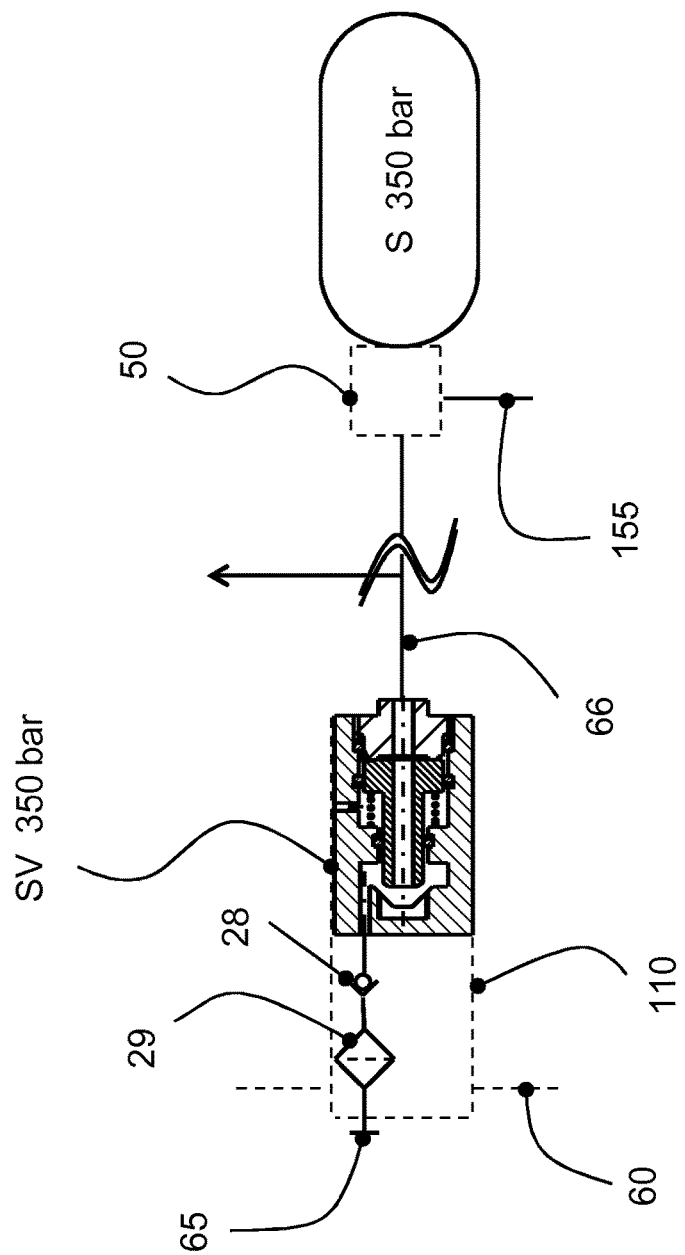
FIG. 3 illustrates a schematic illustration of a tank device for a vehicle, having a shut-off valve and a pressure accumulator vessel.

FIG. 3 illustrates a shut-off valve SV that may have a shut-off pressure of 350 bar, and which may be fitted into a tank neck unit 110 in a body 60 of a motor vehicle. The mechanical structural dimensions (e.g., length, diameter) of a tank neck 65 may define to which fuel nozzle of a filling station the tank neck 65 is connectable. This makes it possible to define the fluid medium (here fuel) which may be replenished. The maximum possible applicable pressure may be the maximum fuel dispensing pressure available at filling stations for the particular fluid medium. During a filling operation, the fluid medium flows through a filter 29 and a nonreturn valve 28 into the inlet opening 10, arranged axially here, of the shut-off valve SV, which may be configured for a predetermined shut-off pressure, for example, of 350 bar. From the outlet opening 11 of the shut-off valve SV, the fluid medium then passes at a predetermined maximum pressure, for example, of 350 bar via a pressure line 66 and via a first accumulator valve block 50 (which may have an additional safety valve and/or a pressure regulator for withdrawing fluid medium) into a pressure accumulator vessel S which has a predetermined permissible operating pressure, for example, of 350 bar. By coordinating the predetermined shut-off pressure (e.g., 350 bar) of the shut-off valve SV with the predetermined permissible operating pressure of the pressure accumulator vessel S and by the permanently connected arrangement of the components in the motor vehicle, safe refuelling irrespective of the fuel-dispensing pressure of the filling station is ensured. Apart from at the first accumulator valve block 50, fluid medium may also be withdrawn at another withdrawal location 155 in the pressure accumulator system.

Figure 4:
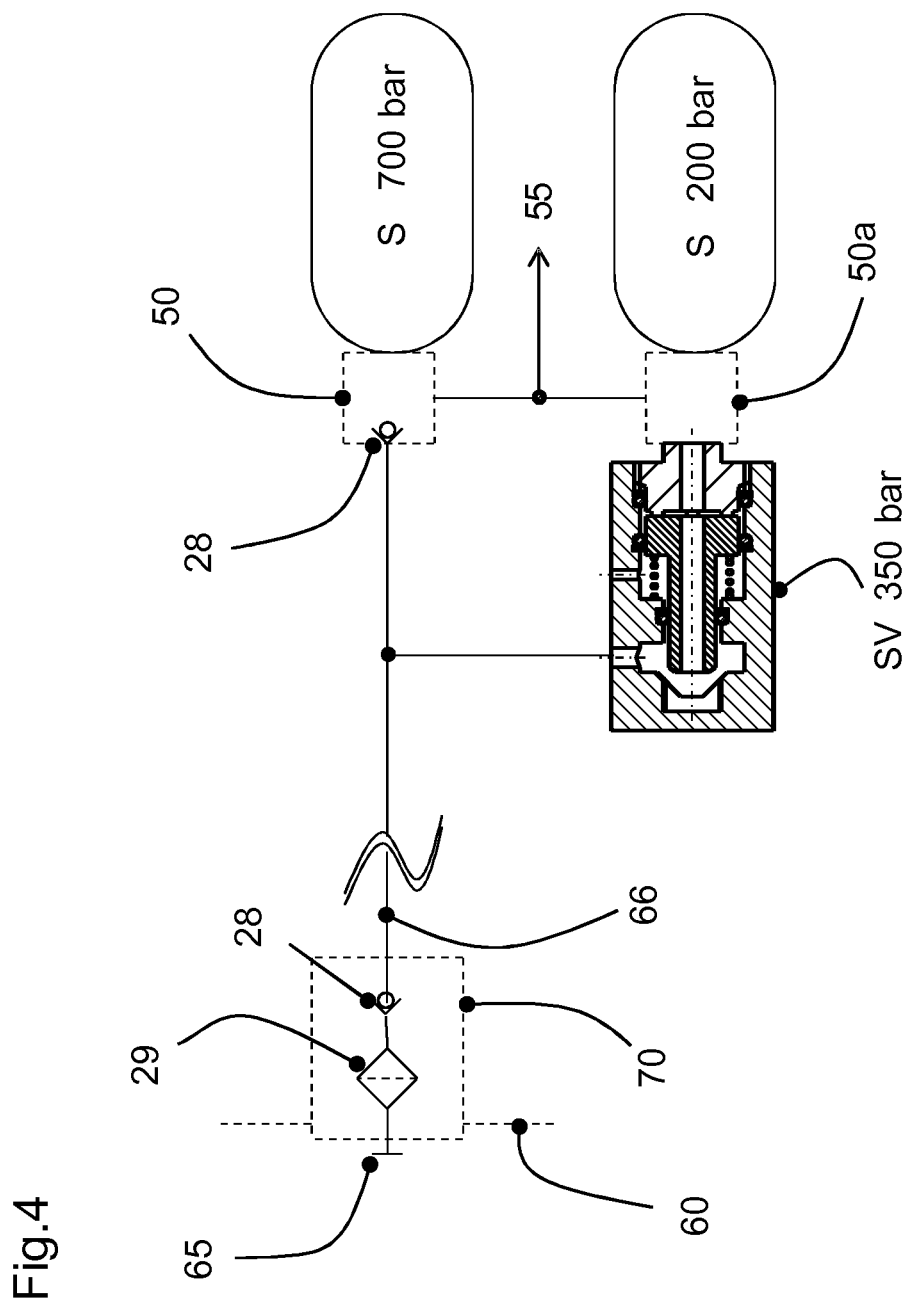
FIG. 4 illustrates a schematic illustration of a device for replenishing a vehicle at a filling station having a dispensing pressure of 700 bar, containing a pressure accumulator system with two pressure vessels having different permissible operating pressure.

FIG. 4 illustrates by way of example a pressure accumulator system with a shut-off valve SV in an application with a parallel arrangement of a plurality, for example, two pressure accumulator vessels S and positioning of the shut-off valve SV upstream of a second accumulator valve block 50a. The tank neck unit 70 may be installed in a body 60 in a motor vehicle and has a tank neck 65. During a filling operation, the fluid medium flows through a filter 29 and a nonreturn valve 28 into the branched pressure line 66. One branch of the pressure line 66 leads via a first accumulator valve block 50 with an installed nonreturn valve 28 into a first pressure accumulator vessel S having a predetermined permissible filling pressure, for example, of 700 bar. In order to remove fluid medium, the first accumulator valve block 50 may have a pressure regulator. The other branch leads into an inlet opening 10, arranged radially here, of a shut-off valve SV configured for a predetermined shut-off pressure, for example, of 200 bar. The fluid medium then passes from the outlet opening 11 of the shut-off valve SV at a maximum pressure of, for example, 200 bar via a second accumulator valve block 50a, which likewise has a second pressure regulator for the withdrawal of the fluid medium, into a second pressure accumulator vessel S, which may be configured for a predetermined permissible filling pressure, for example, of 200 bar. By coordinating the predetermined shut-off pressure (e.g., 200 bar) of the shut-off valve SV with the predetermined permissible operating pressure of the second pressure accumulator vessel S and by the permanently connected arrangement of the components in the motor vehicle, safe refuelling irrespective of the fuel-dispensing pressure of the filling station is ensured. In addition, in spite of different permissible pressure levels, the fluid medium may thereby be guided out of each of the two pressure accumulator vessels S to the consumer independently and simultaneously.

Figure 5:
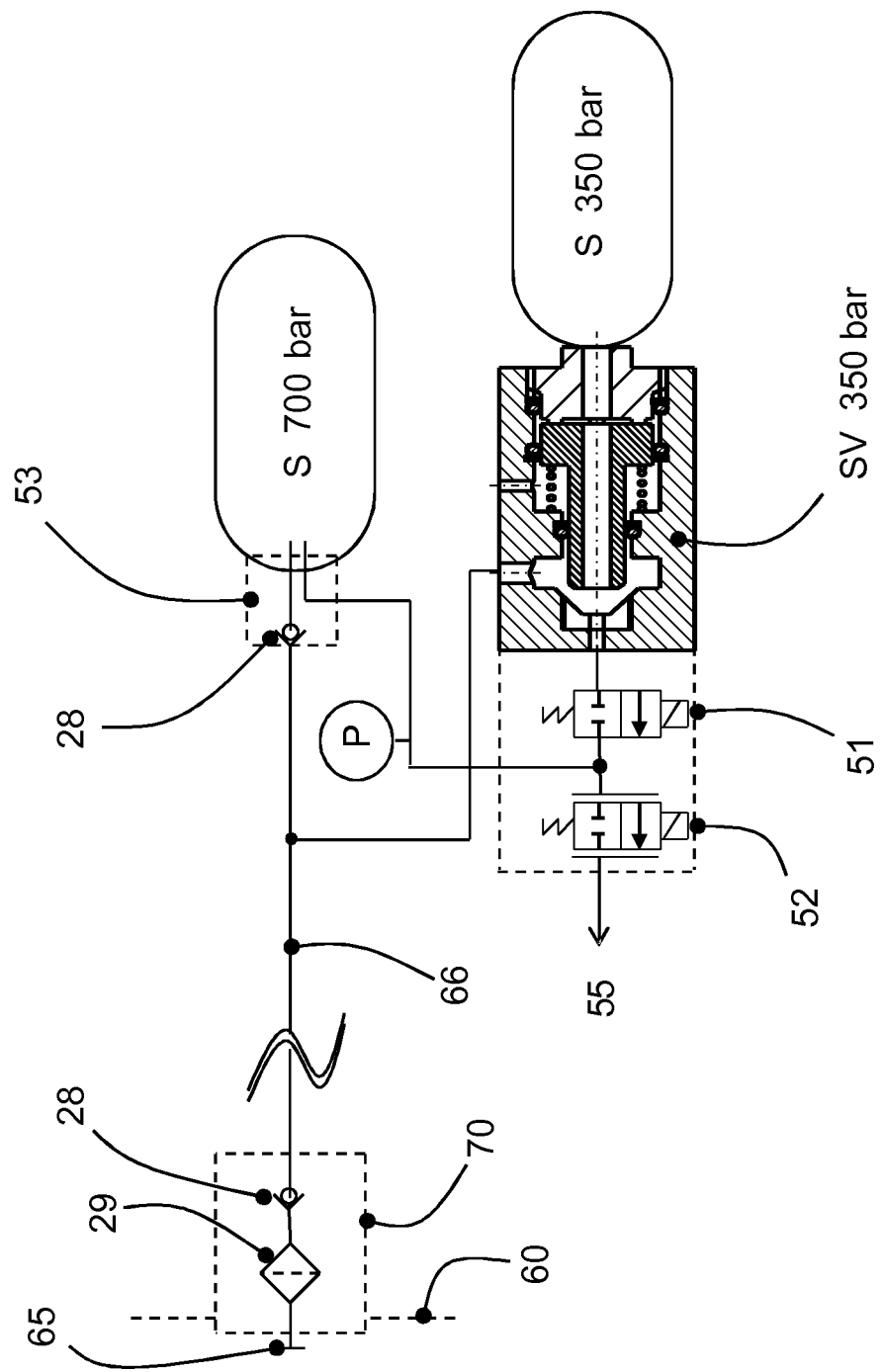
FIG. 5 illustrates a schematic illustration of a device for replenishing a vehicle at a filling station having a dispensing pressure of 700 bar, containing a pressure accumulator system with two pressure vessels having different permissible operating pressure.

FIG. 5 illustrates by way of example a pressure accumulator system comprising a combination of a shut-off valve SV with electrically actuable valves in an application with a parallel arrangement of a plurality, for example, two pressure accumulator vessels S having different permissible operating pressures.

The tank connecting unit 70 may be fitted in a body 60 of a motor vehicle and has a tank neck 65. During the filling operation, the fluid medium flows through a filter 29 and a nonreturn valve 28 into the branched pressure line 66. One branch of the pressure line 66 leads via a first accumulator valve block 53 with a fitted safety valve and nonreturn valve 28 into the first pressure accumulator vessel S having a predetermined permissible filling pressure, for example, of 700 bar. In order to remove the fluid medium, the first accumulator valve block 53 additionally may have a removal line leading to a pressure regulator 52. The other branch leads into an inlet opening 10, which may be arranged radially here, in a shut-off valve SV which may be configured for a predetermined shut-off pressure, for example, of 350 bar, and may be directly connected by the outlet opening 11 thereof to a second pressure accumulator vessel S having a predetermined permissible filling pressure, for example, of 350 bar. The shut-off valve SV illustrated in FIG. 5 additionally has, in the region of the sealing body, an opening which may be connected to an electrically actuable safety valve 51. The electrically actuable safety valve 51 here may be a solenoid valve which may be opened and closed electrically and/or electromagnetically. A pressure regulator 52 may be connected downstream of the electrically actuable safety valve 51. The connecting line coming from the first pressure accumulator vessel S opens into the connecting line between the electrically actuable safety valve 51 and the pressure regulator 52. The first connecting line may have a pressure sensor P. The electrically actuable safety valve 51 permits removal of the fluid medium from the second pressure accumulator vessel S as soon as the pressure in the connecting line has dropped under the predetermined shut-off pressure of the shut-off valve SV.

A further alternative of a shut-off valve SV in accordance with embodiments provides a variation in the embodiment illustrated in FIG. 1. The outlet opening 11 which, in FIG. 1, may be arranged in the cover 24 may be placed into the valve housing 20 under the sealing body 21 in alignment with the axis of movement of the piston 22. The cover 24 then tightly closes off the valve chamber, not including the outlet opening 11. By way of an axial bore in the sealing body 21, which axial bore may be aligned with the new outlet opening in the valve housing 20, the fluid medium may flow, when the valve seat is open, through the passage opening 13 and the axial bore in the sealing body 21 and through the new outlet opening, which may be aligned with the axis of movement of the piston 22, into a pressure accumulator vessel S which may be fixedly connected to the outlet opening. The connecting channel 14 which may be likewise aligned with the axis of movement of the piston 22 enables pneumatic or hydraulic communication of the fluid medium with the second effective piston surface A2 and brings about closing of the shut-off valve when the predetermined shut-off pressure may be reached. This alternative construction of the shut-off valve in accordance with embodiments may be formed in a particularly space-saving manner.

In all of the embodiments in which a sealing body 21 is used, the sealing body 21 has to be sealed off from the valve housing 20 for safety reasons so that no additional forces may arise and act on the sealing surface of the sealing body.

All of the pressure values stated are by way of example and do not in any way limit embodiments and the pressure range for which embodiments is claimed.

In accordance with embodiments, the designation of vehicle includes, for example, motor vehicles, rail vehicles, and also watercraft and aircraft. All of the pressure values stated are by way of example and do not in any way limit the invention and the pressure range for which embodiments is claimed.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

10 Intake opening
11 Outlet opening
12 Relief opening
13 Passage opening
14 Connecting channel
15, 15a Removal channel
16 Channel
17 Valve chamber, inlet region
18 Valve chamber, relief region
19 Valve chamber, accumulator region
20 Valve housing
21 Sealing body
22 Piston
23 Spring
24 Cover
25 Spacer
26 Valve housing
27 Valve-receiving block
28 Nonreturn valve
29 Filter
31 Adjustment spring
32 Spring-fixing screw
33, 34 Closure elements
35 Clamping screw
36 Pressure control valve
37, 38 Sliding surfaces
39 Sealing edge
41, 42, 43 Sealing elements
50, 50a First and second accumulator valve block with pressure regulator
51 Electric safety valve
52 Pressure regulator
53 Accumulator valve block with safety valve
55 Pressure line to the consumer
60 Motor vehicle body
65 Tank neck
66, 67 Pressure line
70 Tank neck unit
110 Tank neck unit (installed)
155 Withdrawal location
A1, A2 First and second effective piston surfaces
A3 Support
D1, D4 Inside diameter, connecting channel
D2, D3 Outside diameter, piston subsections
L1 Overall length of the piston
L2, L3 Length of the piston subsections
P Pressure sensor
S Pressure accumulator vessel
SV Shut-off valve

What is claimed is:

1. A shut-off valve for a pressure accumulator vessel, comprising:
   a valve housing having a valve chamber with an inlet region, a relief region having a relief opening, an accumulator region, an intake opening and an outlet opening facing the pressure accumulator vessel;
   a piston having at least one axial connecting channel, a first effective piston surface facing an inlet region of the valve chamber and a second effective piston surface adjacent to the accumulator region, the piston being configured to axially move in the valve chamber during a change in pressure in the accumulator region;
   a sealing body;
   sealing elements configured to guide the piston during axial movement of the piston in the valve chamber, and between which the relief region is arranged;
   a pressure control valve arranged between the outlet opening and the relief region;
   a bias mechanism; and
   a passage opening arranged between the intake opening and the outlet opening, the passage opening configured to reversibly open and close during the change in pressure in the accumulator region, and, in an unpressurized state, is kept open by the bias mechanism,
   wherein one of the first effective piston surface and the valve housing form a valve seat.

2. The shut-off valve of claim 1, wherein the first effective piston surface and the sealing body are respectively configured such that, in a closed position of the piston, a sealing effect occurs at a sealing edge in the region of an outer border of the first effective piston surface.

3. The shut-off valve of claim 1, wherein the intake opening opens radially outside the first and second effective piston surfaces into the inlet region of the valve chamber.

4. The shut-off valve of claim 1, wherein the second effective piston surface has a surface area greater than the surface area of the first effective piston surface.

5. The shut-off valve of claim 1, wherein the sealing elements are arranged in corresponding recesses in the valve housing.

6. The shut-off valve of claim 1, wherein at least one of the sealing body and the piston is elastically deformable.

7. The shut-off valve of claim 1, wherein the relief opening is operatively connected to a line configured to dispose a fluid medium.

8. The shut-off valve of claim 1, wherein the pressure control valve has a predetermined opening pressure which is greater than a predetermined shut-off pressure of the pressure shut-off valve.

9. The shut-off valve of claim 1, wherein a predetermined shut-off pressure of the shut-off valve corresponds to a force of the bias mechanism and the effective piston surfaces.

10. The shut-off valve of claim 1, wherein the force of the bias mechanism is adjustable via the screw-in depth of a cover.

11. The shut-off valve of claim 1, further comprising a spacer provided over a cover which adjusts the force of the bias mechanism via a screw-in depth thereof.

12. The shut-off valve of claim 1, wherein the valve housing at least partially projects at an end having the outlet opening into an opening in the pressure accumulator vessel and is permanently connected to the pressure accumulator vessel.

13. The shut-off valve of claim 1, further comprising a valve-receiving block configured to connect the outlet opening to the pressure accumulator vessel.

14. The shut-off valve of claim 1, further comprising an accumulator valve block having at least one valve configured to connect the outlet opening to the pressure accumulator vessel.

15. A pressure accumulator system for a vehicle, comprising:
   at least one pressure accumulator vessel; and
   at least one shut-off valve operatively connected to the at least one pressure accumulator vessel, the at least one shut-off valve having:
      a valve housing having a valve chamber with a relief region having a relief opening, an accumulator region, an intake opening and an outlet opening facing the pressure accumulator vessel;
      a piston having at least one axial connecting channel, a first effective piston surface facing an inlet region of the valve chamber and a second effective piston surface adjacent to the accumulator region, the piston being configured to axially move in the valve chamber during a change in pressure in the accumulator region;
      a sealing body;
      sealing elements configured to guide the piston during axial movement of the piston in the valve chamber, and between which the relief region is arranged;
      a pressure control valve arranged between the outlet opening and the relief region;
      a bias mechanism; and
      a passage opening arranged between the intake opening and the outlet opening, the passage opening configured to reversibly open and close during the change in pressure in the accumulator region, and, in an unpressurized state, is kept open by the bias mechanism,
   wherein one of the first effective piston surface and the valve housing form a valve seat.

16. A pressure accumulator system, comprising:
   at least one pressure accumulator vessel; and
   at least one shut-off valve operatively connected to the at least one pressure accumulator vessel, the at least one shut-off valve having:
      a valve housing having a valve chamber with a relief region having a relief opening, an accumulator region, an intake opening and an outlet opening operatively connected to the pressure accumulator vessel;
      a piston in the valve chamber and having a first effective piston surface facing an inlet region of the valve chamber and a second effective piston surface adjacent to the accumulator region, the piston being configured to axially move in the valve chamber during a change in pressure in the accumulator region;
      a pressure control valve arranged between the outlet opening and the relief region;
      a bias mechanism; and
      a passage opening arranged between the intake opening and the outlet opening, the passage opening configured to reversibly open and close during the change in pressure in the accumulator region, and, in an unpressurized state, is kept open by the bias mechanism.

* * * * *